United States Patent
Lee et al.

(10) Patent No.: US 11,363,199 B2
(45) Date of Patent: Jun. 14, 2022

(54) APPARATUS AND METHOD FOR ESTIMATING OPTICAL IMAGE STABILIZATION MOTION

(71) Applicant: Samsung Electronics Co., Ltd., Suwon-si (KR)

(72) Inventors: Bo Hee Lee, Suwon-si (KR); Nak Hoon Kim, Suwon-si (KR); Won Seok Song, Suwon-si (KR); Jae Mu Yun, Hwaseong-si (KR); Hak Jae Jeon, Michuhol-gu (KR); Byung Ho Ahn, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/955,558

(22) PCT Filed: Oct. 16, 2018

(86) PCT No.: PCT/KR2018/012206
§ 371 (c)(1),
(2) Date: Jun. 18, 2020

(87) PCT Pub. No.: WO2019/156308
PCT Pub. Date: Aug. 15, 2019

(65) Prior Publication Data
US 2020/0322534 A1 Oct. 8, 2020

(30) Foreign Application Priority Data

Feb. 7, 2018 (KR) .................. 10-2018-0015224

(51) Int. Cl.
*H04N 5/232* (2006.01)

(52) U.S. Cl.
CPC ....... *H04N 5/23267* (2013.01); *H04N 5/2329* (2013.01); *H04N 5/23258* (2013.01); *H04N 5/23287* (2013.01)

(58) Field of Classification Search
CPC ........ H04N 5/23248–2329; G03B 5/02; G03B 5/06; G03B 2205/0007–0038
See application file for complete search history.

(56) References Cited

U.S. PATENT DOCUMENTS 8,139,885 B2  3/2012  Hsu
8,373,761 B2  2/2013  Jang et al.
(Continued)

FOREIGN PATENT DOCUMENTS

KR   10-2004-0082645 A   9/2004
KR       10-0684009 B1   2/2007
(Continued)

OTHER PUBLICATIONS

European Search Report dated Dec. 11, 2020; European Appln. No. 18904917.4-1209 / 3716608 PCT/KR2018012206.
(Continued)

*Primary Examiner* — Paul M Berardesca
(74) *Attorney, Agent, or Firm* — Jefferson IP Law, LLP

(57) ABSTRACT

An electronic device is disclosed. Moreover, various embodiment found through the disclosure are possible. The electronic device may include a camera module including an optical image stabilizer, a motion sensor, a processor electrically connected to the camera module and the motion sensor. The processor may be configured to obtain first motion information corresponding to shaking of the electronic device through the motion sensor, while at least partially obtaining an image frame, determine second motion information, which corresponds to motion of a lens or an image sensor included in the camera module, from the
(Continued)

first motion information, using attribute information and a frequency pass filter of the optical image stabilizer, and perform digital image correction, based on the first motion information and the second motion information.

13 Claims, 12 Drawing Sheets

(56) References Cited

U.S. PATENT DOCUMENTS

| | | |
|---|---|---|
| 9,124,806 B1 | 9/2015 | Kang |
| 9,467,623 B2 | 10/2016 | Hyun et al. |
| 9,596,411 B2 | 3/2017 | Thivent et al. |
| 9,743,001 B1 | 8/2017 | Stec |
| 9,979,889 B2 | 5/2018 | Thivent et al. |
| 10,313,593 B2 | 6/2019 | Miyahara |
| 2009/0316010 A1* | 12/2009 | Nomura ............. H04N 5/23258 |
| | | 348/208.6 |
| 2016/0360111 A1 | 12/2016 | Thivent et al. |
| 2017/0134658 A1 | 5/2017 | Miyahara |
| 2017/0280059 A1 | 9/2017 | Thivent et al. |
| 2019/0158750 A1* | 5/2019 | Kim ..................... H04N 5/2254 |
| 2019/0191090 A1* | 6/2019 | Murashima .......... G02B 27/646 |
| 2020/0221031 A1* | 7/2020 | Song .................. H04N 5/23219 |

FOREIGN PATENT DOCUMENTS

| | | |
|---|---|---|
| KR | 10-2008-0088347 A | 10/2008 |
| KR | 10-2010-0067406 A | 6/2010 |
| KR | 10-2015-0053495 A | 5/2015 |
| KR | 10-2015-0096902 A | 8/2015 |
| KR | 10-2018-0078576 A | 7/2018 |
| WO | 2017/140438 A1 | 8/2017 |

OTHER PUBLICATIONS

Korean Office Action with English translation dated Jan. 25, 2022; Korean Appln. No. 10-2018-0015224.

* cited by examiner

APPARATUS AND METHOD FOR ESTIMATING OPTICAL IMAGE STABILIZATION MOTION

TECHNICAL FIELD

Embodiments disclosed herein relate to an apparatus and a method for estimating optical image stabilization (OIS) motion.

BACKGROUND ART

An electronic device may obtain an image distorted when a problem, such as the handshaking of a user, is caused during the shooting of the image. The electronic device may perform image correction to compensate for the handshaking of the user. The image correction may include, for example, OIS correction or digital image stabilization (DIS).

The OIS correction may refer to correction that an image stabilizer moves a lens or an image sensor in a direction of compensating for the shaking of an electronic device while a camera module is obtaining an image. The motion of the lens or the image sensor through the OIS correction may be referred to as OIS motion.

The DIS correction may refer to an operation that the electronic device corrects an image based on at least one of image motion and gyro data. Then image motion may refer to information representing the motion of an object (e.g., a feature point) in an image frame. The electronic device may determine the image motion by comparing image frames obtained through the camera modules. The gyro data may refer to information corresponding to the shaking of the electronic device. The gyro data may be obtained through a motion sensor to sense the shaking of the electronic device.

DISCLOSURE

Technical Problem

The OIS correction may be advantageous to correct motion in a higher frequency band, and the DIS correction may be advantageous to correct motion in a lower frequency band. Accordingly, the electronic device may perform both the OIS correction and the DIS correction. For example, the electronic device may perform the OIS correction through the image stabilizer while obtaining an image and may perform the DIS correction for image frames, in which the OIS correction is reflected, through a processor.

An OIS motion data value representing the motion of the lens or the image sensor may differ from a gyro data value representing the shaking of the electronic device. Accordingly, when the electronic device performs only the DIS correction based only on the gyro data or the image motion without considering the OIS motion, the image may be overcompensated by an OIS correction degree.

According to various embodiments of the disclosure, the electronic device may estimate the OIS motion data and may perform the DIS correction based on the estimated OIS motion data.

Technical Solution

According to an embodiment disclosed in the disclosure, an electronic device may include a camera module including an optical image stabilizer, a motion sensor, a processor electrically connected to the camera module and the motion sensor. The processor may be configured to obtain an image frame, which is subject to correction corresponding to shaking of the electronic device by the optical image stabilizer, through the camera module, obtain first motion information corresponding to the shaking of the electronic device through the motion sensor, while at least partially obtaining the image frame, determine second motion information, which corresponds to motion of a lens or an image sensor included in the camera module, from the first motion information, using attribute information and a frequency pass filter of the optical image stabilizer, and perform digital image correction for at least a portion of the image frame, based on the first motion information and the second motion information.

According to an embodiment disclosed in the disclosure, a method of an electronic device may include obtaining an image frame, which is subject to optical image correction corresponding to shaking of the electronic device by an optical image stabilizer, obtaining first motion information corresponding to the shaking of the electronic device, while at least partially obtaining the image frame, determining second motion information, which corresponds to motion of a lens or an image sensor included in the camera module, from the first motion information, using attribute information and a frequency pass filter of the optical image stabilizer, and performing digital image correction for at least a portion of the image frame, based on the first motion information and the second motion information.

According to an embodiment disclosed in the disclosure, a camera module may include a lens assembly, an image sensor, an optical image stabilizer configured to control motion of at least one of the lens assembly and the image sensor, corresponding to the shaking of the camera module, a motion sensor configured to sense the shaking of the camera module, and an image signal processor electrically connected to the lens assembly, the image sensor, the optical image stabilizer, and the motion sensor. The image signal processor may be configured to obtain an image frame, which is subject to correction by the optical image stabilizer, through the image sensor, obtain first motion information corresponding to the shaking of the camera module through the motion sensor, while at least partially obtaining the image frame, determine second motion information, which corresponds to motion of a lens or an image sensor included in the camera module, from the first motion information, using attribute information and a frequency pass filter of the optical image stabilizer, and perform digital image correction for at least a portion of the image frame, based on the first motion information and the second motion information.

Advantageous Effects

According to the embodiments disclosed in the disclosure, the electronic device may perform the DIS correction by estimating the OIS motion data and more exactly reflecting the motion made through the OIS correction.

According to the embodiments disclosed in the disclosure, the electronic device may more exactly compensate for a problem caused by the handshaking, by performing both the OIS correction and the DIS correction.

Besides, a variety of effects directly or indirectly understood through the disclosure may be provided.

DESCRIPTION OF DRAWINGS

In the following description made with respect to the accompanying drawings, similar components will be assigned with similar reference numerals.

MODE FOR INVENTION

Hereinafter, various embodiments of the disclosure may be described with reference to accompanying drawings. However, those of ordinary skill in the art will understand that the disclosure is not limited to a specific embodiment, and modifications, equivalents, and/or alternatives on the various embodiments described herein can be variously made without departing from the scope and spirit of the disclosure.

Figure 1:
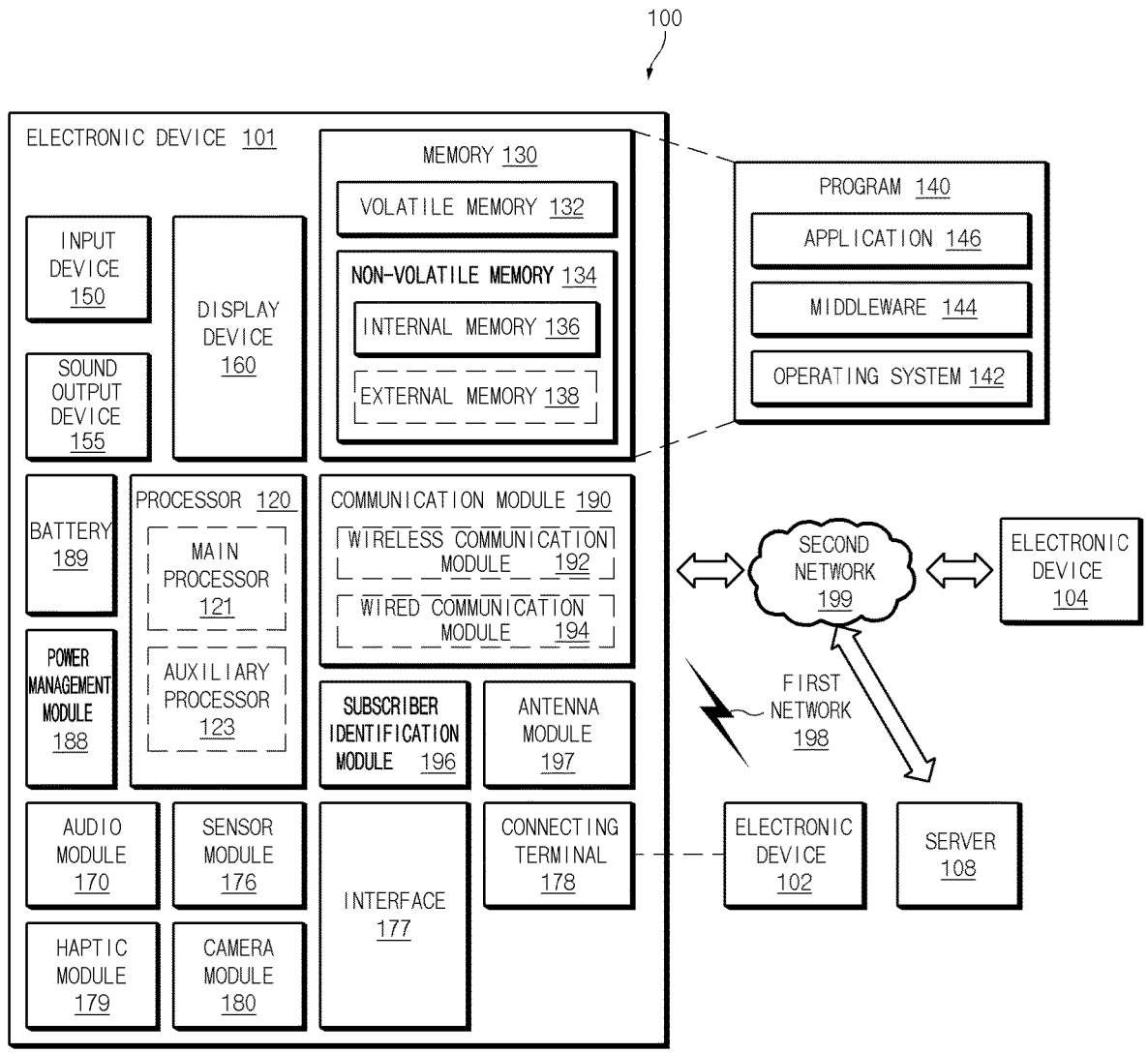
FIG. 1 is a block diagram illustrating an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP), and an auxiliary processor 123 (e.g., a graphics processing unit (GPU), an image signal processor (ISP), a sensor hub processor, or a communication processor (CP) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA) or the second network 199 (e.g., a long-range communication network, such as a cellular network, the Internet, or a computer network (e.g., LAN or wide area network (WAN). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
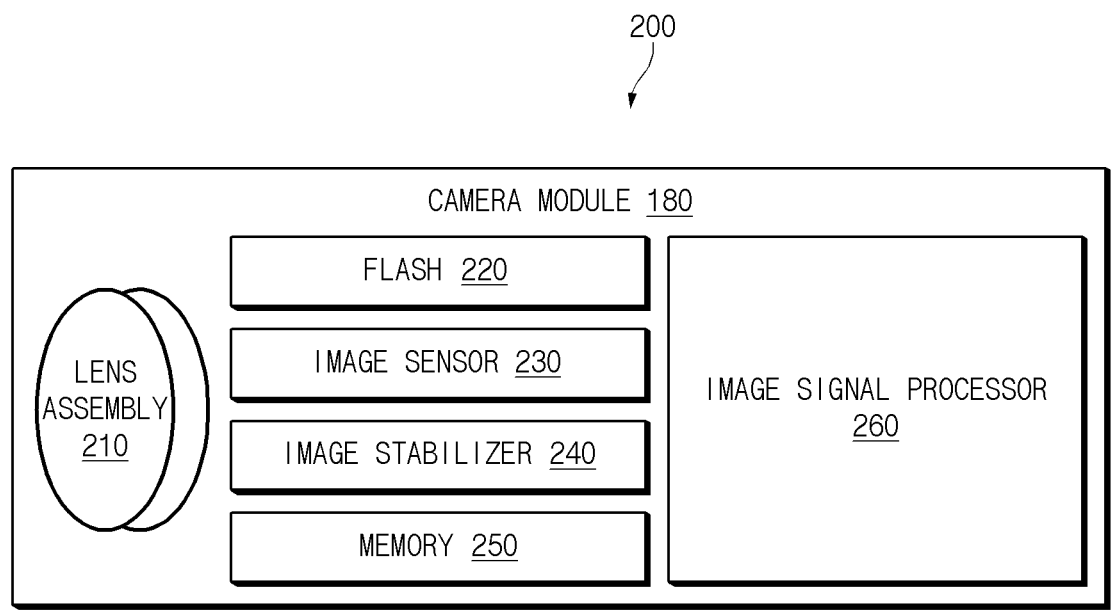
FIG. 2 is a block diagram of a camera module, according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
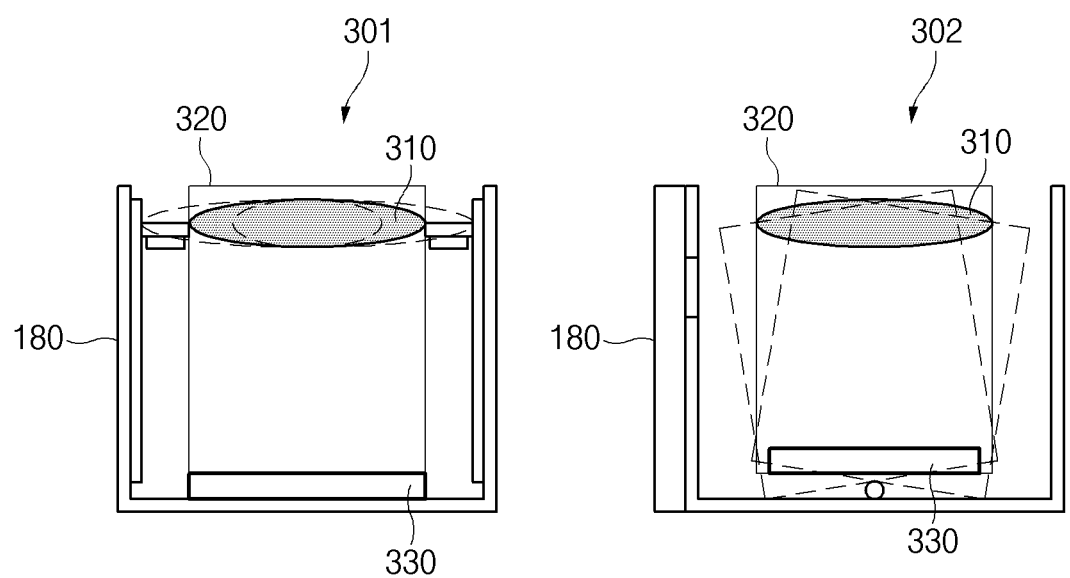
FIG. 3 illustrates an OIS correction operation, according to various embodiments.

FIG. 3 illustrates an OIS correction operation, according to various embodiments.

Referring to FIG. 3, an electronic device 101 may include a camera module 180. Although FIG. 3 illustrates the electronic device 101 including only the camera module 180, the electronic device 101 may further include other components which are not illustrated in FIG. 3. For example, the electronic device 101 may further include a motion sensor (e.g., the sensor module 176 of FIG. 1) to sense the shaking of the electronic device 101 inside or outside the camera module 180. For another example, the electronic device 101 may further include an image stabilizer (e.g., the image stabilizer 240 of FIG. 2) to control the motion of at least one of a lens 310, an image sensor 330, or a module 320.

According to an embodiment, the camera module 180 may include the lens 310 (e.g., the lens assembly 210 of FIG. 2) and the image sensor 330 (e.g., the image sensor 230 of FIG. 2). The lens 310 may collect light reflected from a subject and may transmit the light to the image sensor 330. The image sensor 330 may obtain an image by converting the light transmitted from the lens 310 into an electrical signal.

According to an embodiment, when the electronic device 101 is shaken while the electronic device 101 is obtaining an image, the electronic device 101 (e.g., the image stabilizer 240) may perform OIS correction to compensate for the shaking of the electronic device 101. For example, the image stabilizer 240 may sense the shaking of the camera module 180 through a sensor (e.g., a gyro sensor or an acceleration sensor) embedded in the camera module 180, and may control at least one of components of the camera module 180 to physically move corresponding to the sensed shaking. For example, referring to reference numeral 301 of FIG. 3, the image stabilizer 240 may perform the OIS correction through a lens shift manner that the lens 310 shifts. For another example, referring to reference numeral 302 of FIG. 3, the image stabilizer 240 may perform the OIS correction through a module tilt manner that the module 320 including the lens 310 and the image sensor 330 move. For another example, although not illustrated in FIG. 3, the image stabilizer 240 may perform the OIS correction through a sensor shift manner that the image sensor 330 shifts.

According to an embodiment, the electronic device 101 may sense the motion of the electronic device 101 using a sensor used for the OIS correction and an additional motion sensor (e.g., the gyro sensor or the acceleration sensor). In the disclosure, information corresponding to the motion of the electronic device 101 may be referred to as first motion information or gyro data. Further, in the disclosure, information corresponding to the motion of the lens 310, the image sensor 330, or the module 320 through the OIS correction may be referred to as second motion information or OIS motion data. According to an embodiment, the first motion information or the second motion information may be expressed as an angle variation or a vector over time. The information corresponding to the motion of the electronic device 101 may differ from the information corresponding to the motion of the lens 310, the image sensor 330, or the module 320. Accordingly, the electronic device 101 may not obtain the second motion information through the motion sensor to sense the first motion information. When the electronic device 101 performs the DIS correction for the image frame without considering the second motion information, the image may be overcompensated by an OIS correction degree. According to various embodiments of the disclosure, the electronic device 101 may estimate the second motion information from the first motion information, and may more exactly perform the DIS correction based on the estimated second motion information. In the disclosure, motion information, which is obtained by removing the second motion information from the first motion information, may be referred to as third motion information.

Figure 4:
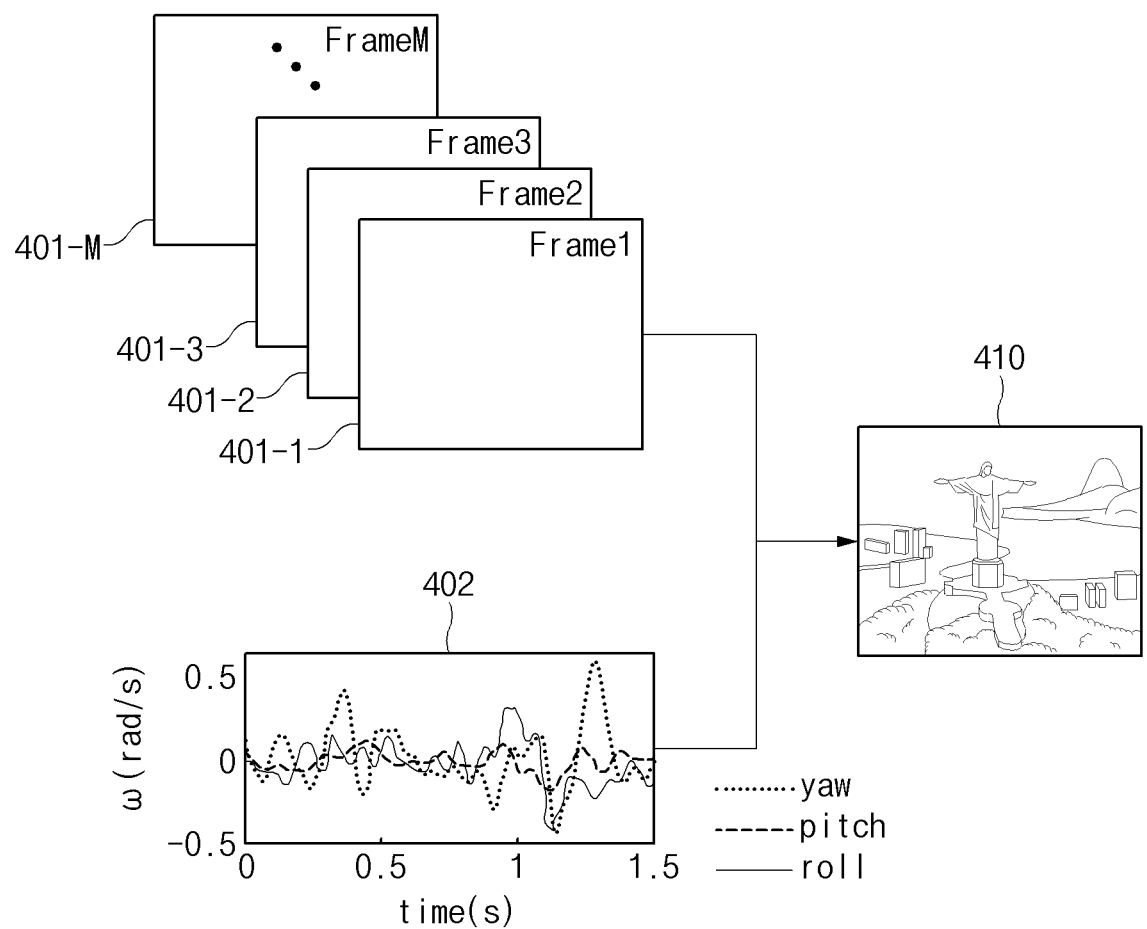
FIG. 4 illustrates a DIS correction, according to various embodiments.

FIG. 4 illustrates a DIS correction operation, according to various embodiments.

Referring to FIG. 4, the electronic device 101 may generate an image 410 by performing the DIS correction based on at least one of a plurality of image frames 401-1, 401-2, 401-3, . . . , and 401-M (M is a natural number equal to or greater than '4'), which are obtained through the camera module 180, and first motion information 402 corresponding to the motion of the electronic device 101. According to an embodiment, the DIS correction may be referred to as electronic image stabilization (EIS) correction. The number of image frames is not limited to an example illustrated in FIG. 4. For example, the camera module 180 may obtain one or more image frames.

According to an embodiment, the electronic device 101 may identify a shaking degree of an image by comparing the plurality of image frames 401-1, 401-2, 401-3, . . . , and 401-M with each other. For example, the electronic device 101 may identify a feature point in the image frames and may identify the shaking degree of the image based on a position, a distance, or a direction that the feature point moves in the image frames. The feature point may be used interchangeably with an edge, a feature, a key point, an interesting point, or a corner. In the disclosure, information indicating the motion of the feature point in the image frame may be referred to as a fourth motion information or image motion. According to an embodiment, the electronic device 101 may determine the fourth motion information corresponding to the motion of one feature point by comparing two image frames with each other.

According to an embodiment, the electronic device 101 may obtain the first motion information 402 corresponding to the motion of the electronic device 101 through the motion sensor (e.g., the sensor module 176 of FIG. 1). According to an embodiment, the first motion information 402 may represent motion information of the electronic device 101 shaken in at least one of a roll direction, a yaw direction, or a pitch direction.

According to an embodiment, the electronic device 101 may perform the DIS correction only using the fourth motion information or may perform the DIS correction using the fourth motion information and the first motion information 402. For example, the electronic device 101 may perform the DIS correction only using the fourth motion information, when the first motion information 402 is not reliable. The case that the first motion information 402 is not reliable may include a case that at least some of the first motion information obtained through the motion sensor is omitted. For another example, the electronic device 101 may perform the DIS correction using the fourth motion information and the first motion information 402 when the DIS correction performed only using the fourth motion information is not reliable. The case that the DIS correction performed only using the fourth motion information is not reliable may include, for example, the case that a feature point is not exactly extracted from the image frames, the case that there is a repeated pattern (e.g., a stripe pattern) in the image frames, or the case that the obtained image frames include local motion.

Figure 5:
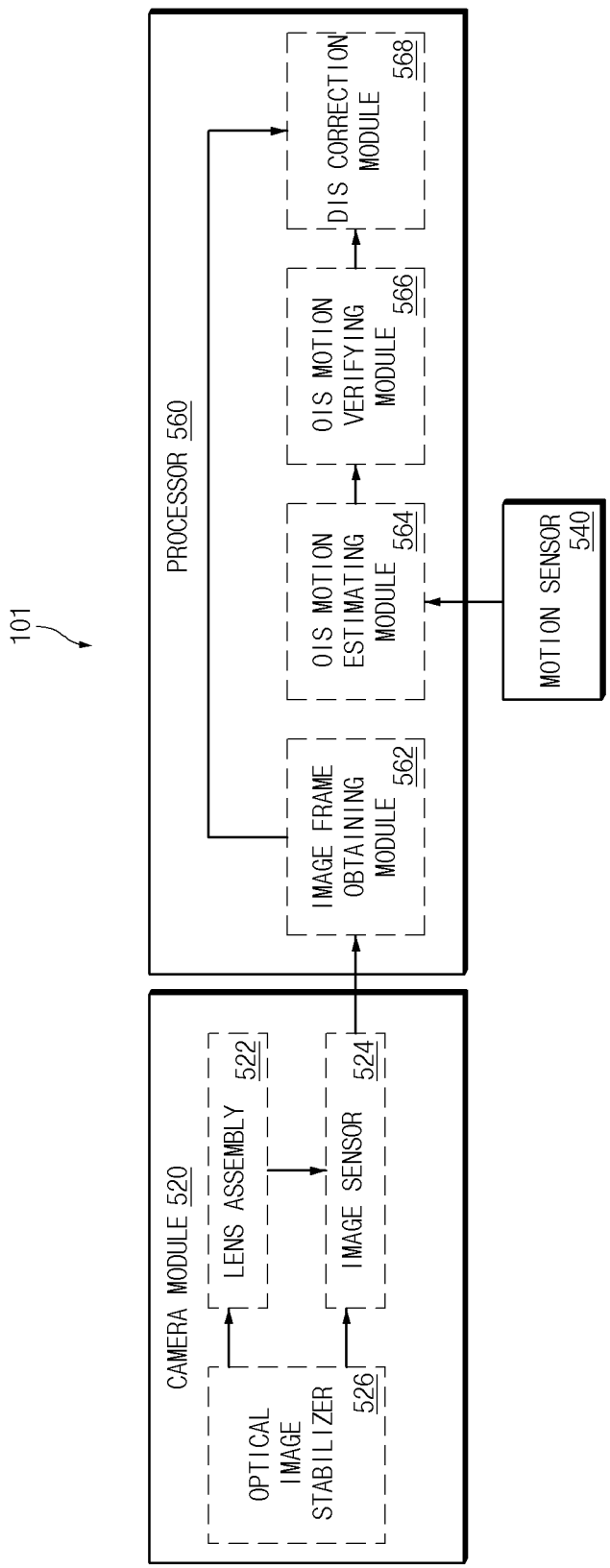
FIG. 5 illustrates a block diagram of an electronic device including a camera module and a motion sensor, according to various embodiments.

FIG. 5 illustrates a block diagram of an electronic device including a camera module and a motion sensor, according to various embodiments.

Referring to FIG. 5, the electronic device 101 may include a camera module 520 (e.g., the camera module 180 of FIG. 1), a motion sensor 540 (e.g., the sensor module 176 of FIG. 1), and a processor 560 (e.g., the processor 120 of FIG. 1 or the image signal processor 260 of FIG. 2). According to an embodiment, the electronic device 101 may not include at least one of the components illustrated in FIG. 5 or may further include at least additional one component. For example, the electronic device 101 may further include a display (e.g., the display device 160 of FIG. 1) to output an image subject to the OIS correction and the DIS correction.

For another example, the electronic device 101 may further include a memory (e.g., the memory 130 of FIG. 1 or the memory 250 of FIG. 2) including instructions used to control other components by a processor 560.

According to an embodiment, the camera module 520 may obtain an image frames based on the light reflected from the subject and may perform the OIS correction while the image frames are obtained. The camera module 520 may include a lens assembly 522 (e.g., the lens assembly 210 of FIG. 2 or the lens 310 of FIG. 3), an image sensor 524 (e.g., the image sensor 230 in FIG. 2 or the image sensor 330 of FIG. 3), and an optical image stabilizer 526 (e.g., the image stabilizer 240 of FIG. 2).

According to an embodiment, the optical image stabilizer 526 may control the lens assembly 522 or the image sensor 524 to move.

According to an embodiment, the image sensor 524 may obtain image frames including a subject by using light collected by the lens assembly 522 and transmit the image frames to the processor 560.

According to an embodiment, the motion sensor 540 may measure the first motion information corresponding to the motion of the electronic device 101 while the camera module 520 at least partially obtains the image frames. The motion sensor 540 may include, for example, a gyro sensor or an acceleration sensor. The motion sensor 540 may be embedded in the camera module 520 or may be disposed outside the camera module 520. According to an embodiment, the motion sensor 540 may transmit the first motion information to the processor 560. According to an embodiment, the motion sensor 540 may be a sensor separate from a sensor used for OIS correction.

According to an embodiment, the processor 560 may receive the image frames, which are subject to the OIS correction, from the camera module 520, and may perform DIS correction for the image frames based on the first motion information received from the motion sensor 540. The processor 560 may include an image frame obtaining module 562, an OIS motion estimating module 564, an OIS motion verifying module 566, and a DIS correction module 568. The image frame obtaining module 562, the OIS motion estimating module 564, the OIS motion verifying module 566, and the DIS correction module 568 may be a hardware module or a software module.

According to an embodiment, the processor 560 may obtain at least one image frame, which is subject to the OIS correction, from the camera module 520 through the image frame obtaining module 562.

According to an embodiment, the processor 560 may estimate second motion information from first motion information through the OIS motion estimating module 564. For example, the processor 560 may estimate the second motion information by allowing the first motion information to pass through a high frequency pass filter (HPF). The HPF may be determined based on attribute information of the optical image stabilizer 526. The attribute information of the optical image stabilizer 526 may include a range of an angle at which the lens assembly 522 or the image sensor 524 is movable in the OIS correction operation.

According to an embodiment, the processor 560 may determine whether the second motion information, which is estimated through the OIS motion verifying module 566, is reliable. For example, the processor 560 may determine whether the estimated second motion information is reliable, based on whether the frequency of the first motion information received from the motion sensor 540 is equal to or greater than a specified threshold value. According to an embodiment, the processor 560 may perform DIS correction through the DIS correction module 568 without determining whether the second motion information is reliable.

According to an embodiment, the processor 560 may perform DIS correction with respect to at least one image frame based on the estimated second motion information and the first motion information, through the DIS correction module 568. For example, the processor 560 may generate the third motion information, which is obtained by removing the second motion information from the first motion information. The processor 560 may perform the DIS correction based on at least one of the third motion information and the fourth motion information (e.g., the image motion).

Figure 6:
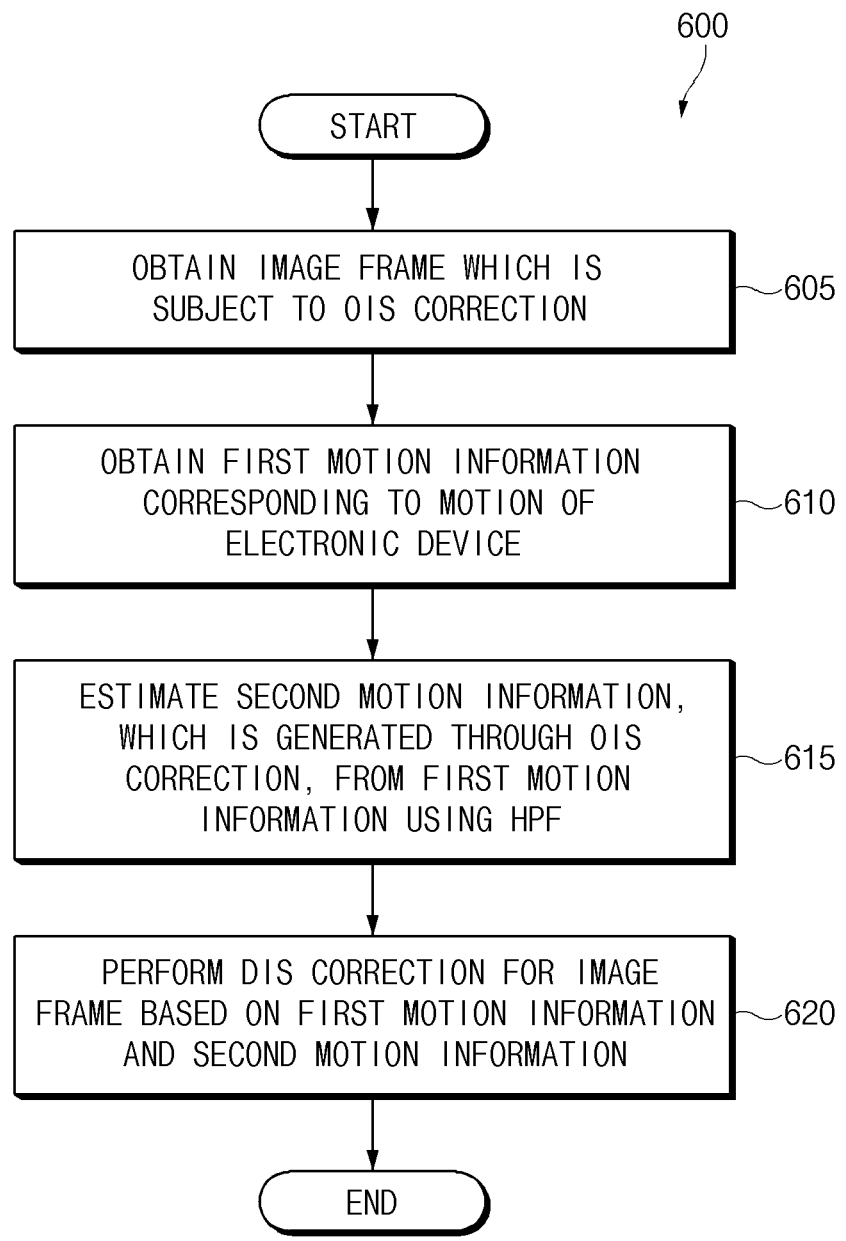
FIG. 6 is a flowchart illustrating an operation of an electronic device that performs DIS correction based on motion information generated through OIS correction according to various embodiments.

FIG. 6 is a flowchart illustrating an operation of an electronic device that performs DIS correction based on motion by OIS correction according to various embodiments. The operations illustrated in FIG. 6 may be implemented by the electronic device 101 or the processor 560.

Referring to FIG. 6. In operation 605 of method 600, the processor 560 may obtain an image frame, which is subject to the correction by the optical image stabilizer 526, from the camera module 520. The correction of the optical image stabilizer 526 may be referred to as "OIS correction". The optical image stabilizer 526 may control the motion of the lens assembly 522, the image sensor 524, or the camera module 520.

In operation 610, the processor 560 may obtain first motion information 402 corresponding to the motion of the electronic device 101 from the motion sensor 540 while obtaining the image frame. The first motion information may be expressed as an angle variation or a vector over time. According to an embodiment, the frequency of the first motion information obtained by the motion sensor 540 may be larger than the number of image frames obtained by the camera module 520 during the same time. For example, when the camera module 520 obtains an image frame at every 30 ms, the motion sensor 540 may obtain the first motion information at every 10 ms. The processor 560 may correct the image frame, in unit of a line instead of a frame using two pieces of the first motion information obtained in every image frame. The detailed embodiment of correcting the image frame in unit of a line will be described with reference to FIG. 11.

In operation 615, the processor 560 may estimate the second motion information, which is generated through the OIS correction, from the first motion information using the HPF. According to an embodiment, the HPF may be determined based on attribute information of the optical image stabilizer 526. The detailed example of determining the HPF will be described with reference to FIG. 7.

In operation 620, the processor 560 may perform DIS correction for the image frame based on the first motion information and the second motion information. For example, the processor 560 may determine the third motion information obtained by removing the second motion information from the first motion information, and perform DIS correction based on the third motion information and the fourth motion information corresponding to the motion of at least one feature point in the image frame.

Through method 600 described above, the electronic device 101 may more exactly perform the DIS correction by reflecting the OIS motion gyro data used in the DIS correction.

Figure 7:
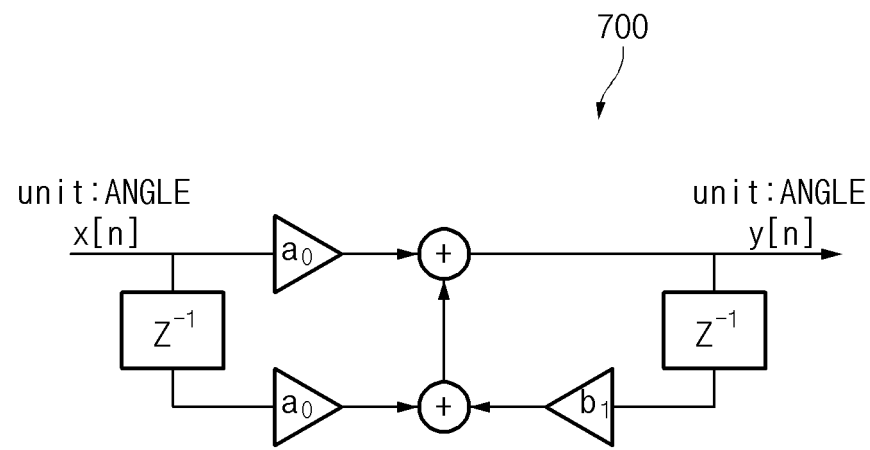
FIG. 7 illustrates an HPF circuit to estimate second motion information, which corresponds to motion by OIS correction, from first motion information corresponding to motion of an electronic device, according to various embodiments.

FIG. 7 illustrates an HPF circuit to estimate second motion information, which corresponds to motion by OIS correction, from first motion information corresponding to motion of an electronic device, according to various embodiments.

Referring to FIG. 7, the processor 560 may estimate the second motion information (y[n]) by applying first motion information (x[n]) to an HPF 700. The first motion information (x[n]) may refer to, for example, gyro data corresponding to the motion of the electronic device 101, and the second motion information (y[n]) may refer to, for example, OIS motion data corresponding to the motion of the lens assembly 522 or the image sensor 524 through the OIS operation. The HPF (H(z)) may be expressed as in following Equation 1.

$$H(z) = \frac{a_0 + a_1 z^{-1}}{1 - b_1 z^{-1}} \quad \text{Equation 1}$$

In Equation 1, 'z' may refer to a z-transform parameter, and 'a0', 'a1', and 'b1' may refer to filter coefficients, respectively. The filter coefficients may be determined based on the range of an angle at which the lens assembly 522 or the image sensor 524 is movable in the OIS correction operation. The processor 560 may estimate the second motion information (y[n]) as in following Equation 2, through Equation 1 representing the HPF 700.

$$y[n] = a_0 x[n] + a_1 x[n]^{-1} + b_1 y[n]^{-1} \quad \text{Equation 2}$$

Figure 8:
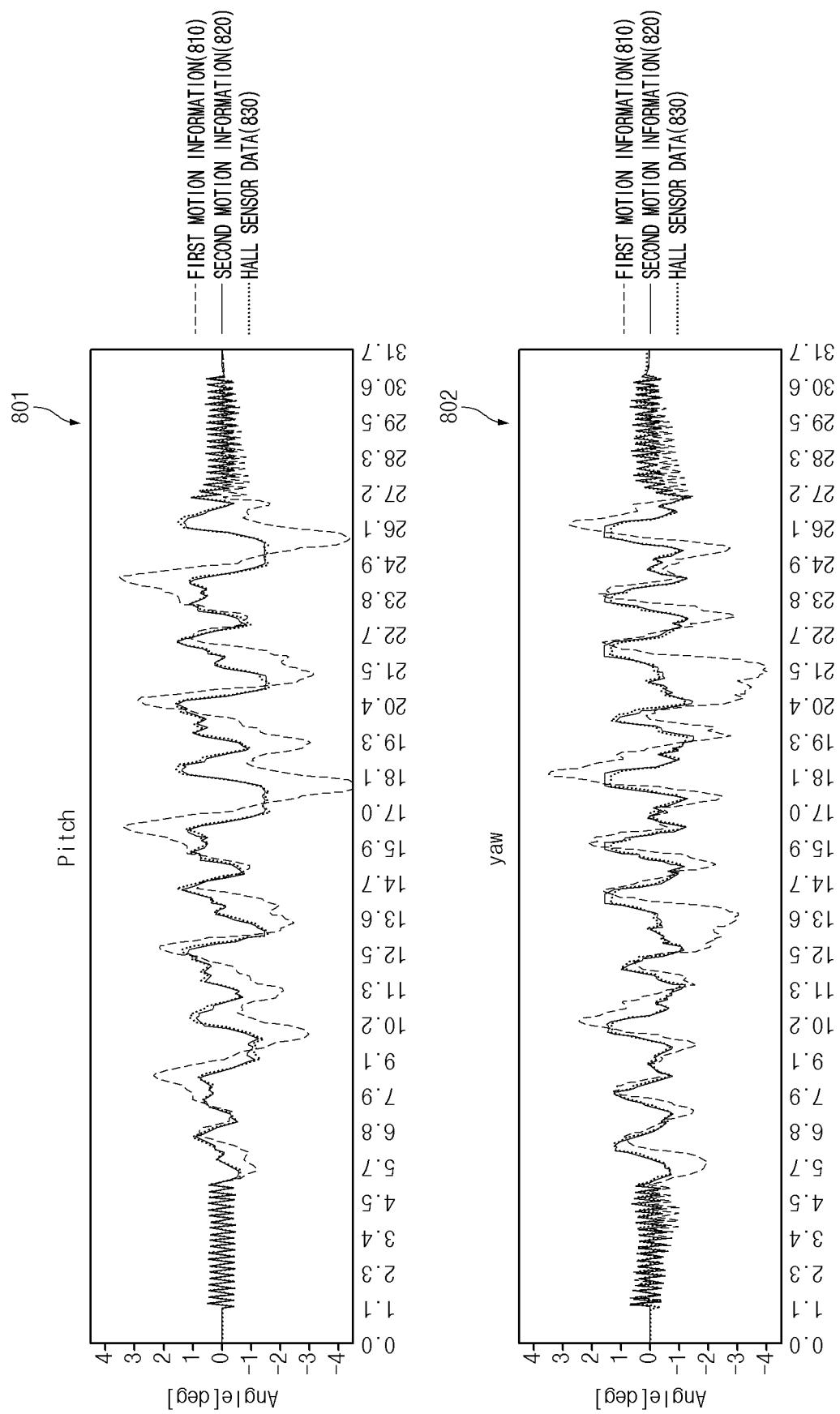
FIG. 8 is a graph illustrating second motion information estimated using an HPF, according to various embodiments.

FIG. 8 is a graph illustrating second motion information estimated using an HPF, according to various embodiments.

Referring to FIG. 8, graph 801 may illustrate an estimation result of second motion information in a pitch direction, and graph 802 may illustrate an estimation result of second motion information in a yaw direction. Although not illustrated in FIG. 8, an estimation result of second motion information in a roll direction may be similarly represented. In graph 801 and graph 802, a horizontal axis may represent time (unit: sec), and a vertical axis may represent an angle (unit: degree).

In graph 801 and graph 802, hall sensor data 830 may represent a measurement result of the OIS motion by the hall sensor. The second motion information 820 estimated from the first motion information through the HPF 700 may have a value same as or similar to the hall sensor data 830 measured by the hall sensor. The electronic device 101 may more apparently estimate the OIS motion from gyro data measured through the motion sensor without additionally using the hall sensor.

Figure 9:
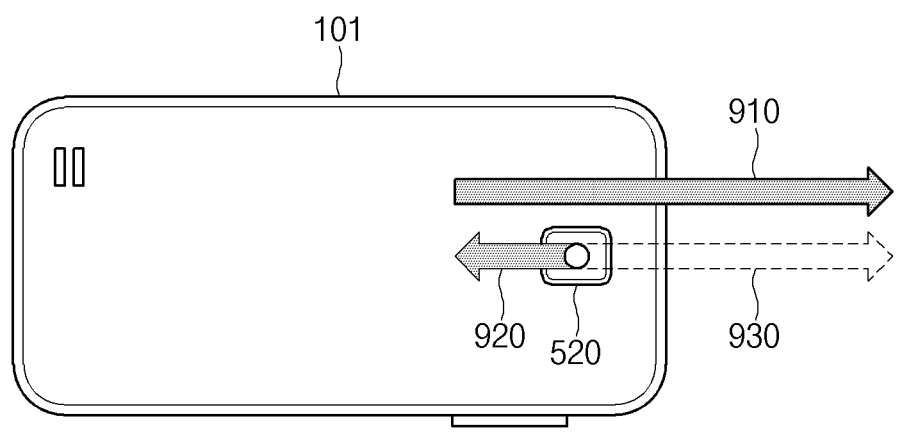
FIG. 9 illustrates an operation of correcting an image based on first motion information and second motion information, according to various embodiments.

FIG. 9 illustrates an operation of correcting an image based on first motion information and second motion information, according to various embodiments.

Referring to FIG. 9, the electronic device 101 may be shaken in a direction indicated as in reference numeral 910 due to various causes such as the handshaking of a user. The processor 560 may determine the first motion information in the direction indicated as in reference numeral 910 by detecting the motion of the electronic device 101 through the motion sensor 540.

According to an embodiment, the optical image stabilizer 526 may control the lens assembly 522, the image sensor 524, or the camera module 520 to move in a direction illustrated in reference numeral 920 which is an opposite direction to the direction illustrated in reference numeral 910. The length indicated in reference numeral 920 may be shorter than the length indicated in reference numeral 910, due to the physical limit such as the range of the angle at which the lens assembly 522 and the image sensor 524 are movable.

According to an embodiment, the processor 560 may obtain the image frame, which is subject to the OIS correction, from the camera module 520. The image frame, which is subject to the OIS correction, may have a residual swing motion as illustrated in reference numeral 930. The processor 560 may estimate second motion information in the direction illustrated in reference numeral 920, from first motion information in the direction illustrated in reference numeral 910, and may determine third motion information obtained by removing the second motion information from the first motion information. The third motion information may refer to motion information as illustrated in reference numeral 930. The processor 560 may determine the third motion information based on following Equation 3.

Third motion information=first motion information+ second motion information   Equation 3

According to an embodiment, the processor 560 may perform DIS correction for an image frame based on the third motion information. For example, the processor 560 may determine fourth motion information representing the motion of at least one feature point in an image frame, and may perform the DIS correction based on the third motion information and the fourth motion information.

Figure 10:
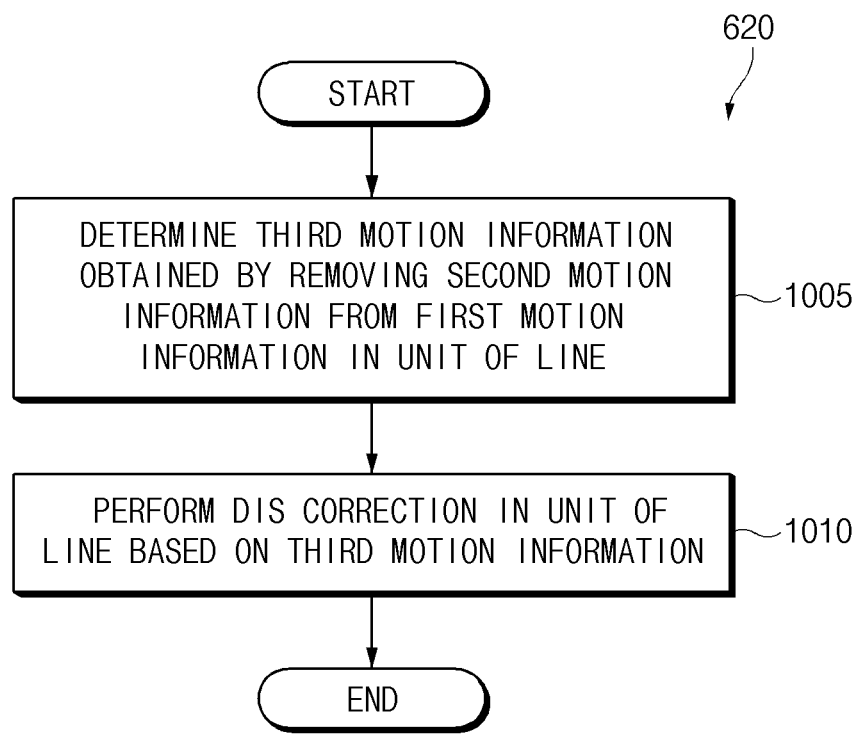
FIG. 10 is a flowchart illustrating an operation of an electronic device to perform DIS correction in unit of a line based on third motion information obtained by removing second motion information from first motion information, according to various embodiments.

FIG. 10 is a flowchart illustrating an operation of an electronic device to perform DIS correction in unit of a line based on third motion information obtained by removing second motion information from first motion information, according to various embodiments. Operations illustrated in FIG. 10 may refer to operations obtained by implementing operation 620 of FIG. 6 in more detail.

Referring to FIG. 10, in operation 1005, the processor 560 may determine the third motion information, which is obtained by removing the second motion information from the first motion information, with respect to each of a plurality of lines constituting an image frame.

In operation 1010, the processor 560 may perform DIS correction in unit of a line based on third motion information. The electronic device 101 may correct rolling shutter distortion by performing the DIS correction based on the third motion information in unit of a line instead of a frame.

Figure 11:
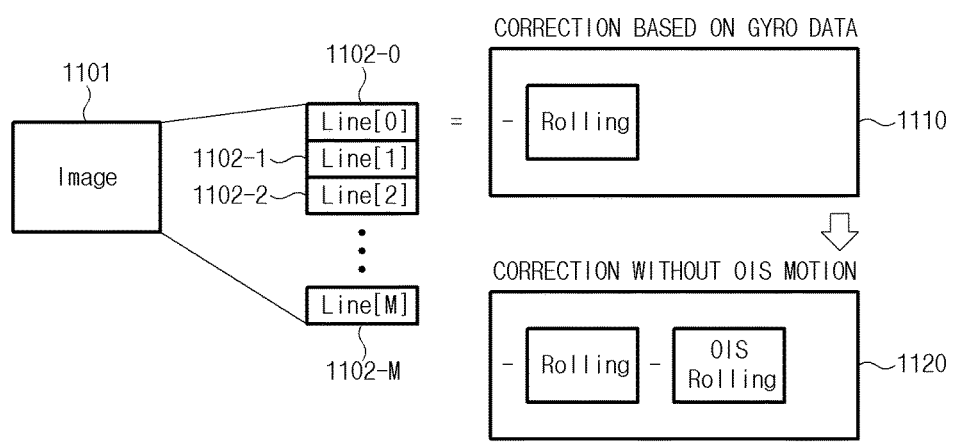
FIG. 11 illustrates an operation to correct an image in unit of a line, according to various embodiments.

FIG. 11 illustrates an operation to correct an image in unit of a line, according to various embodiments.

Referring to FIG. 11, when the image sensor 524 is a CMOS sensor, the electronic device 101 may sequentially read out light from the uppermost line 1102-0 to the lowermost line 1102-M (M is a natural number equal to or greater than 1) while obtaining the image frame 1101. An operation that the electronic device 101 reads out light in unit of a line may be referred to as a rolling shutter operation. A time that the light reflected from the subject is incident into the image sensor 524 is varied depending on lines. Accordingly, an image may be distorted due to the difference between times at which light is incident. In the disclosure, the distortion caused by the rolling shutter operation may be referred to as rolling shutter distortion or a jello effect.

According to an embodiment, the frequency of the first motion information obtained through the motion sensor may be higher than frequencies of image frames obtained through the camera module 520 during the same time. For example, the electronic device 101 may obtain an image frame 1101 at every 30 ms, and may obtain the first motion information at every 10 ms. The electronic device 101 obtains two or more pieces of first motion information in unit of one image frame. Accordingly, the electronic device 101 may correct the image frame 1101 in unit of a line using two or more pieces of first motion information.

Referring to reference numeral 1110, the electronic device 101 may correct the rolling shutter distortion in unit of a line inside the image frame 1101 based on two or more pieces of first motion information. According to an embodiment, two or more pieces of first motion information may be obtained with respect to each of lines 1102-0, 1102-1, . . . , and 1102-M constituting the image frame 1101. According to another embodiment, the electronic device 101 may obtain first motion information for at least two lines of the lines 1102-0, 1102-1, . . . , and 1102-M. For example, the electronic device 101 may obtain only first motion information for the line 1101-0 and only first motion information for the line 1102-3 inside the image frame 1101. The electronic device 101 may estimate first motion information for remaining lines in which first motion information is not obtained, by using the two pieces of first motion information, which is obtained, and an interpolation scheme. The electronic device 101 may generate first motion information for all lines inside the image frame 1101 based on the obtained first motion information and the estimated first motion information, and may correct rolling shutter distortion in unit of a line.

Referring to reference numeral 1120, the electronic device 101 may perform rolling shutter distortion correction and DIS correction by obtaining multiple pieces of third motion information obtained by removing second motion information from first motion information through the operation of FIG. 6 or FIG. 10. According to an embodiment, the electronic device 101 may perform rolling shutter distortion correction and the DIS correction in unit of line by obtaining third motion information with respect to lines 1102-0, 1102-1, . . . , and 1102-M constituting the image frame 1101. According to another embodiment, the electronic device 101 may perform the rolling shutter distortion correction and the DIS correction in unit of line by obtaining third motion information for at least two of lines 1102-0, 1102-1, . . . , and 1102-M, and by using the obtained third motion information and the interpolation scheme.

Figure 12:
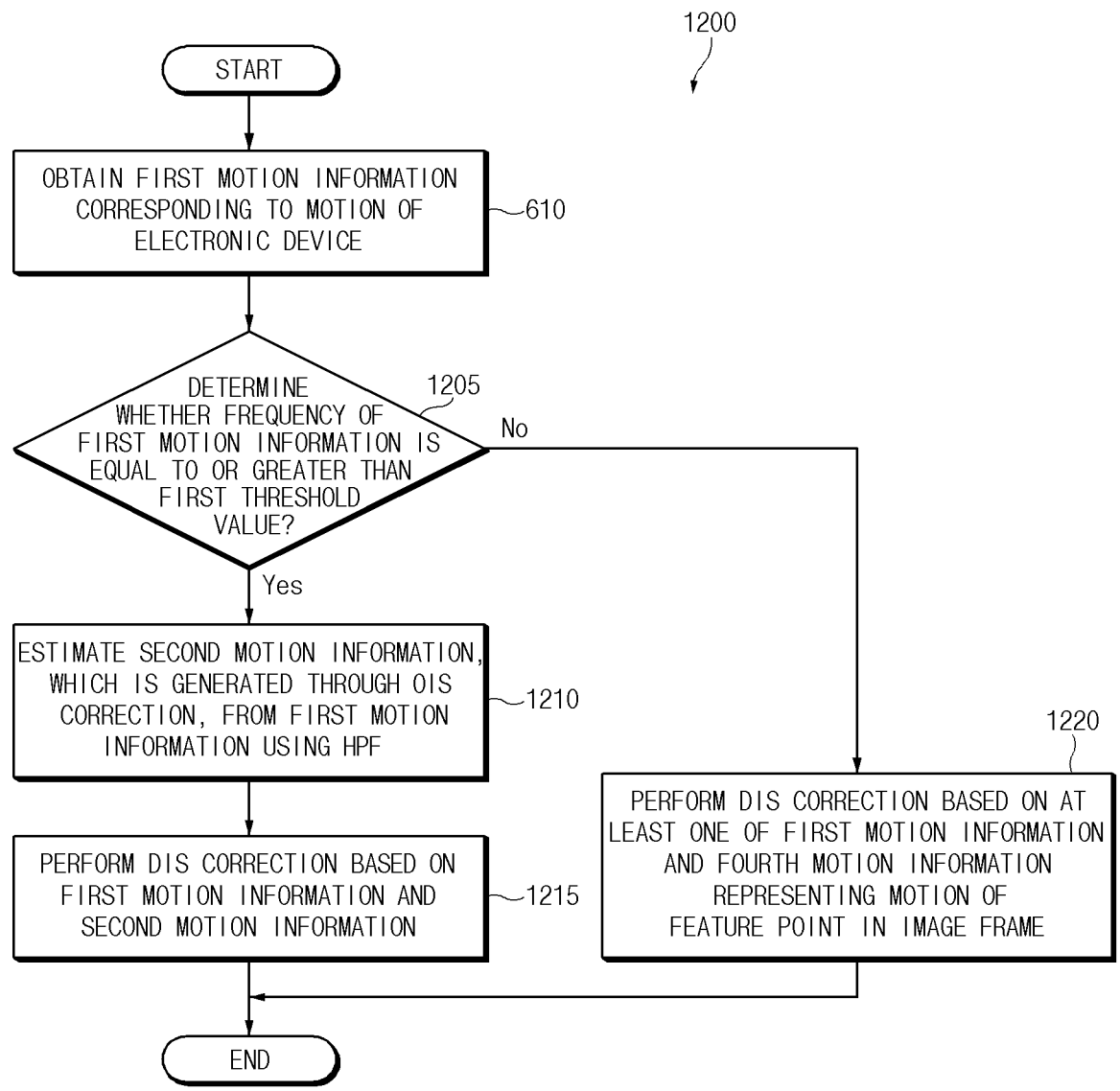
FIG. 12 illustrates an operation of an electronic device to adaptively perform DIS correction based on the frequency of first motion information according to various embodiments.

FIG. 12 illustrates an operation of an electronic device to adaptively perform the DIS correction based on the frequency of first motion information, according to various embodiments. The operations illustrated in FIG. 12 may be implemented by the electronic device 101 or the processor 560.

Referring to FIG. 12, the processor 560 may determine whether first motion information is reliable in operation 1205, after obtaining the first motion information from the motion sensor 540 in operation 610 of method 1200. For example, the processor 560 may determine whether the frequency of the received first motion information is equal to or greater than a specified first threshold value. When the frequency of the first motion information is equal to or greater than the first threshold value, the first motion information is reliable. Accordingly, the processor 560 may implement operation 1210 and operation 1215. When the frequency of the first motion information is less than the first threshold value, the first motion information is not reliable. Accordingly, the processor 560 may implement operation 1220.

In operation 1210, the processor 560 may estimate second motion information, which is generated through the OIS correction using the HPF, from the first motion information. In operation 1215, the processor 560 may perform DIS correction for an image frame based on the first motion information and the second motion information. For example, the processor 560 may determine third motion information obtained by removing the second motion information from the first motion information, and perform DIS correction based on the third motion information and fourth motion information representing the motion of at least one feature point in the image frame. According to an embodiment, the processor 560 may perform DIS correction in unit of a line based on the third motion information.

In operation 1220, the processor 560 may perform DIS correction based on at least one of the first motion information and the fourth motion information. For example, when the first motion information is less than a second threshold value which is specified, the processor 560 may perform the DIS correction based on the four motion information. For another example, when the processor 560 may not identify a feature point from an image frame within a specified time, may identify a repeated pattern inside the image frame, or the image frame includes a local motion, the processor 560 may perform the DIS correction based on the first motion information or based on the first motion information and fourth motion information.

Through the above-described manner, the electronic device 101 may prevent the performance of the DIS correction from being deteriorated by adaptively performing the DIS correction depending on the reliability degree of the estimated value for the OIS motion.

As described above, an electronic device (e.g., the electronic device 101 of FIG. 1) may include a camera module (e.g., the camera module 520 of FIG. 5) including an optical image stabilizer (e.g., the optical image stabilizer 526 of FIG. 5), a motion sensor (e.g., the motion sensor 540 of FIG. 5), a processor (e.g., the processor 560 of FIG. 5) electrically connected to the camera module and the motion sensor. The processor may be configured to obtain an image frame, which is subject to correction corresponding to shaking of the electronic device by the optical image stabilizer, through the camera module, obtain first motion information corresponding to the shaking of the electronic device through the motion sensor, while at least partially obtaining the image frame, determine second motion information, which corresponds to motion of a lens or an image sensor included in the camera module, from the first motion information, using attribute information and a frequency pass filter of the optical image stabilizer, and perform digital image correction for at least a portion of the image frame, based on the first motion information and the second motion information.

According to an embodiment, the attribute information may include a range of an angle, at which the lens or the image sensor moves by the image stabilizer.

According to an embodiment, the processor may be configured to perform the digital image correction for each of a plurality of lines included in the image frame.

According to an embodiment, the processor may be configured to correct a first line of the plurality of lines using some information, which corresponds to the first line, of the second motion information, and correct a second line of the plurality of lines using other information, which corresponds to the second line, of the second motion information.

According to an embodiment, the processor may be configured to determine whether frequency of the first motion information is less than a first threshold value which is specified, perform the digital image correction based on the first motion information and the second motion information, when the frequency of the first motion information is equal to or greater than the first threshold value, and perform the digital image correction based on at least one of the first motion information and fourth motion information, which represents motion of at least one feature point in the image frame, when the frequency of the first motion information is less than the first threshold value.

According to an embodiment, the processor may be configured to perform the digital image correction based on the fourth motion information, when the frequency of the first motion information is less than a second threshold value which is specified.

According to an embodiment, the processor may be configured to perform the digital image correction based on the first motion information or based on the first motion information and the fourth motion information, when the at least one feature point is not identified in the image frame within a specified time, the image frame includes a repeated pattern, or the image frame includes local motion.

According to an embodiment, the motion sensor may be embedded in the camera module or attached to an outer portion of the camera module.

As described above, a method of an electronic device may include obtaining an image frame, which is subject to optical image correction corresponding to shaking of the electronic device by an optical image stabilizer, obtaining first motion information corresponding to the shaking of the electronic device, while at least partially obtaining the image frame, determining second motion information, which corresponds to motion of a lens or an image sensor included in the camera module, from the first motion information, using attribute information and a frequency pass filter of the optical image stabilizer, and performing digital image correction for at least a portion of the image frame, based on the first motion information and the second motion information.

According to an embodiment, the attribute information may include a range of an angle, at which the lens or the image sensor moves by the image stabilizer.

According to an embodiment, the performing of the digital image correction for the image frame, based on the first motion information and the second motion information may include performing the digital image correction for each of a plurality of lines included in the image frame.

According to an embodiment, the performing the digital image correction for each of the plurality of lines included in the image frame may include correcting a first line of the plurality of lines using some information, which corresponds to the first line, of the second motion information, and correcting a second line of the plurality of lines using other information, which corresponds to the second line, of the second motion information.

According to an embodiment, the method may further include determining whether frequency of the first motion information is less than a first threshold value which is specified, performing the digital image correction based on the first motion information and the second motion information, when the frequency of the first motion information is equal to or greater than the first threshold value, and performing the digital image correction based on at least one of the first motion information and fourth motion information, which represents motion of at least one feature point in the image frame, when the frequency of the first motion information is less than the first threshold value.

According to an embodiment, the method may include performing the digital image correction based on the fourth motion information, when the frequency of the first motion information is less than a second threshold value which is specified.

According to an embodiment, the method may include performing the digital image correction based on the first motion information or based on the first motion information and the fourth motion information, when the at least one feature point is not identified in the image frame within a specified time, the image frame includes a repeated pattern, or the image frame includes local motion.

As described above, the camera module (e.g., the camera module 180 of FIG. 2) may include a lens assembly (e.g., the lens assembly 210 of FIG. 2), an image sensor (e.g., the image sensor 230 of FIG. 2), an optical image stabilizer (e.g., the image stabilizer 240 of FIG. 2) configured to control motion of at least one of the lens assembly and the image sensor, corresponding to the shaking of the camera module, a motion sensor (e.g., the motion sensor 540 of FIG. 5) configured to sense the shaking of the camera module, and an image signal processor (e.g., the image signal processor 260 of FIG. 2) electrically connected to the lens assembly, the image sensor, the optical image stabilizer, and the motion sensor. The image signal processor may be configured to obtain an image frame, which is subject to correction by the optical image stabilizer, through the image sensor, obtain first motion information corresponding to the shaking of the camera module through the motion sensor, while at least partially obtaining the image frame, determine second motion information, which corresponds to motion of a lens or an image sensor included in the camera module, from the first motion information, using attribute information and a frequency pass filter of the optical image stabilizer, and perform digital image correction for at least a portion of the image frame, based on the first motion information and the second motion information.

According to an embodiment, the image signal processor may be configured to perform the digital image correction for each of a plurality of lines included in the image frame.

According to an embodiment, the image signal processor may be configured to correct a first line of the plurality of lines using some information, which corresponds to the first line, of the second motion information, and correct a second line of the plurality of lines using other information, which corresponds to the second line, of the second motion information.

According to an embodiment, the image signal processor may determine whether frequency of the first motion information is less than a first threshold value which is specified, may perform the digital image correction based on the first motion information and the second motion information, when the frequency of the first motion information is equal to or greater than the first threshold value, and may perform the digital image correction based on at least one of the first motion information and fourth motion information, which represents motion of at least one feature point in the image frame, when the frequency of the first motion information is less than the first threshold value.

According to an embodiment, the image signal processor may be configured to perform the digital image correction based on the fourth motion information, when the frequency of the first motion information is less than a second threshold value which is specified.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a camera module comprising a lens, an image sensor, and an optical image stabilizer controlling a position of the image sensor and the lens;
a motion sensor; and
a processor electrically connected to the camera module and the motion sensor,
wherein the processor is configured to:
obtain an image frame with a first frequency, which is subject to optical image correction by the optical image stabilizer, wherein the optical image correction corresponding to a shaking of the electronic device,
obtain a first motion value corresponding to the shaking of the electronic device through the motion sensor with a second frequency, while at least partially obtaining the image frame,
determine a second motion value, which corresponds to motion of the lens or the image sensor, by applying the first motion value to a high frequency pass filter of the optical image stabilizer,
determine a third motion value by removing the second motion value from the first motion value through the motion sensor, and
perform digital image correction for at least a portion of the image frame, based on the third motion value, and
wherein the second frequency is higher than the first frequency.

2. The electronic device of claim 1, wherein the first motion value includes:
a range of an angle, at which the lens or the image sensor moves by the optical image stabilizer.

3. The electronic device of claim 1, wherein the processor is further configured to:
correct a first line of a plurality of lines included in the image frame using a first value, which corresponds to the first line, of the second motion value, and
correct a second line of the plurality of lines using a second value, which corresponds to the second line, of the second motion value.

4. The electronic device of claim 1, wherein the processor is further configured to:
  determine whether the second frequency of the first motion value is less than a first threshold value which is specified,
  perform the digital image correction based on the first motion value and the second motion value, when the second frequency of the first motion value is equal to or greater than the first threshold value, and
  perform the digital image correction based on at least one of the first motion value or a fourth motion value, which represents motion of at least one feature point in the image frame, when the second frequency of the first motion value is less than the first threshold value.

5. The electronic device of claim 4, wherein the processor is further configured to:
  perform the digital image correction based on the fourth motion value, when the second frequency of the first motion value is less than a second threshold value which is specified.

6. The electronic device of claim 5, wherein the processor is further configured to:
  perform the digital image correction based on the first motion value or based on the first motion value and the fourth motion value, when the at least one feature point is not identified in the image frame within a specified time, the image frame includes a repeated pattern, or the image frame includes local motion.

7. The electronic device of claim 1, wherein the motion sensor is embedded in the camera module or attached to an outer portion of the camera module.

8. A method of an electronic device including a motion sensor and a camera module comprising a lens, an image sensor, and an optical image stabilizer controlling a position of the image sensor and the lens, the method comprising:
  obtaining an image frame subject to optical image correction by the optical image stabilizer with a first frequency, wherein the optical image correction corresponding to a shaking of the electronic device;
  obtaining a first motion value corresponding to the shaking of the electronic device with a second frequency, while at least partially obtaining the image frame;
  determining a second motion value, which corresponds to motion of the lens or the image sensor, by applying the first motion value to a high frequency pass filter of the optical image stabilizer;
  determining a third motion value by removing the second motion value from the first motion value; and
  performing digital image correction for at least a portion of the image frame, based on multiple pieces of the third motion value,
  wherein the second frequency is higher than the first frequency.

9. The method of claim 8, wherein the first motion value includes:
  a range of an angle at which the lens or the image sensor moves by the optical image stabilizer.

10. The method of claim 8, wherein the obtaining the image frame subject to the optical image correction includes:
  correcting a first line of a plurality of lines included in the image frame using a first value, which corresponds to the first line, of the second motion value, and
  correcting a second line of the plurality of lines using the second motion value, which corresponds to the second line, of the second motion value.

11. The method of claim 8, further comprising:
  determining whether the second frequency of the first motion value is less than a first threshold value which is specified;
  performing the digital image correction based on the first motion value and the second motion value, when the second frequency of the first motion value is equal to or greater than the first threshold value; and
  performing the digital image correction based on at least one of the first motion value or a fourth motion value, which represents motion of at least one feature point in the image frame, when the second frequency of the first motion value is less than the first threshold value.

12. The method of claim 11, further comprising:
  performing the digital image correction based on the fourth motion value, when the second frequency of the first motion value is less than a second threshold value which is specified.

13. The method of claim 12, further comprising:
  performing the digital image correction based on the first motion value or based on the first motion value and the fourth motion value, when the at least one feature point is not identified in the image frame within a specified time, the image frame includes a repeated pattern, or the image frame includes local motion.

* * * * *